US009413472B2

(12) United States Patent
Haynes et al.

(10) Patent No.: US 9,413,472 B2
(45) Date of Patent: Aug. 9, 2016

(54) SYSTEMS AND METHODS FOR POWER MANAGEMENT IN A BEACON

(71) Applicants: Derek Haynes, Bonita Springs, FL (US); Guido Albert Lemke, Hopewell Junction, NY (US)

(72) Inventors: Derek Haynes, Bonita Springs, FL (US); Guido Albert Lemke, Hopewell Junction, NY (US)

(73) Assignee: Cejay Engineering, LLC, Bonita Springs, FL (US)

( * ) Notice: Subject to any disclaimer, the term of this patent is extended or adjusted under 35 U.S.C. 154(b) by 88 days.

(21) Appl. No.: 14/321,104

(22) Filed: Jul. 1, 2014

(65) Prior Publication Data

US 2015/0008843 A1    Jan. 8, 2015

Related U.S. Application Data

(60) Provisional application No. 61/842,061, filed on Jul. 2, 2013.

(51) Int. Cl.
| | |
|---|---|
| *G05B 19/42* | (2006.01) |
| *H04B 17/10* | (2015.01) |
| *F21V 23/00* | (2015.01) |
| *G01S 13/78* | (2006.01) |
| *G09G 3/32* | (2016.01) |

(52) U.S. Cl.
CPC ............... *H04B 17/102* (2015.01); *F21V 23/00* (2013.01); *G01S 13/78* (2013.01); *G09G 3/32* (2013.01)

(58) Field of Classification Search
USPC ......... 315/291; 250/338.1, 504 R; 700/73, 86
See application file for complete search history.

(56) References Cited

U.S. PATENT DOCUMENTS

| | | | | |
|---|---|---|---|---|
| 5,299,227 | A | * | 3/1994 | Rose .................... G01S 7/481 340/5.81 |
| 6,069,557 | A | | 5/2000 | Anglin et al. |
| 7,399,967 | B1 | * | 7/2008 | Haynes .................... F41G 1/36 250/338.1 |
| 7,456,754 | B1 | | 11/2008 | Haynes et al. |
| 2002/1017638 | | | 11/2002 | Rankin et al. |
| 2004/0113817 | A1 | * | 6/2004 | Novak .................... G01S 1/70 340/983 |
| 2008/0170012 | A1 | | 7/2008 | S et al. |
| 2011/0007938 | A1 | | 1/2011 | Haynes et al. |
| 2012/0147376 | A1 | | 6/2012 | Jung et al. |

OTHER PUBLICATIONS

European Search Report issued Jun. 3, 2016 in corresponding European patent application No. EP 14 819 397.2 (5 pages).
International Preliminary Report on Patentability for International Application No. PCT/US2014/045062, mailed Nov. 4, 2014 (5 pages).
International Search Report for PCT/US2014/045062 mailed Nov. 4, 2014 (1 page).

* cited by examiner

*Primary Examiner* — Thuy Vinh Tran
(74) *Attorney, Agent, or Firm* — Finnegan, Henderson, Farabow, Garrett & Dunner, LLP

(57) ABSTRACT

A method for power management in a beacon includes determining a program density of a signaling program; determining an initial driving voltage using the program density; determining a current setting for an emitter using the initial driving voltage; adjusting the initial driving voltage to a start-up voltage; executing the signaling program using the start-up voltage; and adjusting the start-up voltage to a signaling voltage.

13 Claims, 5 Drawing Sheets

SYSTEMS AND METHODS FOR POWER MANAGEMENT IN A BEACON

COPYRIGHT AUTHORIZATION

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

CROSS REFERENCE TO RELATED APPLICATIONS

This application claims the benefit of U.S. Provisional Application No. 61/842,061, filed Jul. 2, 2013, which is incorporated by reference herein.

FIELD

This disclosure relates to beacons, and more particularly to beacons employing power management systems and methods.

BACKGROUND

The inability of reconnaissance to distinguish between friend or foe in low light or total darkness is a major failing of battlefield and law enforcement operations. In these types of lighting conditions, not only does the probability of fratricide (the inadvertent killing of friendly forces by other friendly forces) increase, but time and resources are wasted during attempts to confirm identification. Furthermore, during the heat of battle, mistakes in identification are more likely to occur. Accordingly, there is a need to facilitate effortless and accurate nighttime identification and classification of a distant target or location by a remote sensor.

To this end, beacons have been used in conjunction with night vision equipment including light-intensifying systems that operate by amplifying visible and near infrared light. Beacons emit unique flashing infrared or thermal signatures referred to as signaling programs that are distinguished from operational surroundings by means of intense concentrated energy pulses. Although invisible to the naked eye, signaling programs emitted by beacons can be seen through fog, smoke, and darkness when viewed through night vision or thermal imaging (FLIR) observation devices.

Beacons are generally carried by soldiers and law enforcement personnel. Accordingly, beacons need to be lightweight. Further, since soldiers and law enforcement personnel often carry beacons in the field, beacons need to be powered by readily-available power sources that can be easily procured and replaced. Beacons powered by readily-available, small sources would meet both these weight and availability requirements. Using a commercially available, small source to power a beacon, however, presents circuit design challenges because the voltage output of these power sources is generally lower than the operating voltage of the elements being driven by the power source. For example, these power sources may drive emitters such as thermal or infrared light emitting diodes or thermal solid state devices having an operating voltage that exceeds the nominal characteristics of the power source.

DETAILED DESCRIPTION

Figure 1:
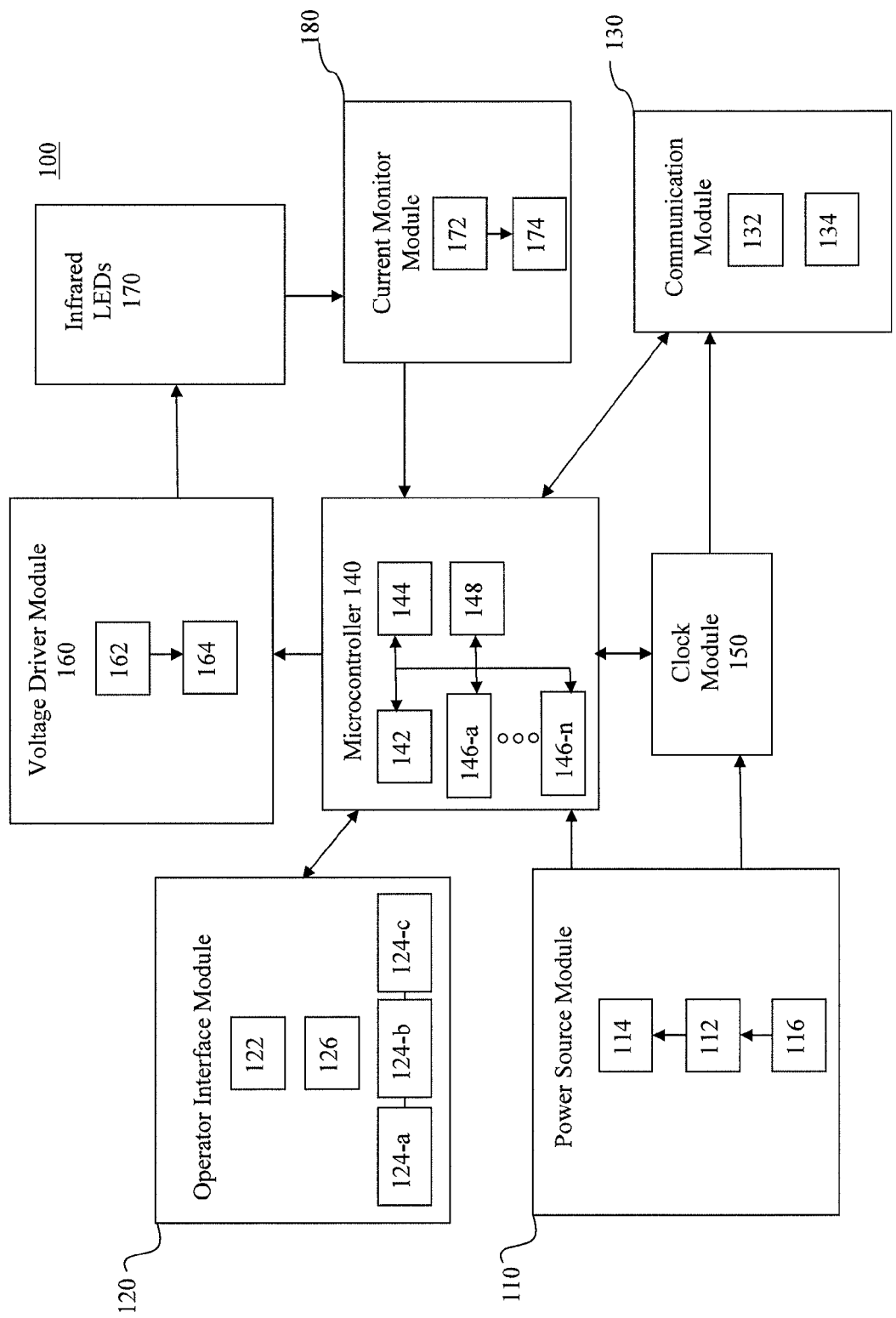
FIG. 1 is a block diagram of an exemplary beacon in which power management systems and methods consistent with embodiments of the present disclosure operate.

Systems and methods consistent with the present disclosure provide a beacon power management system that allows a beacon to be powered by a small, readily-available power source having a voltage output that may be lower than the operating voltage of the elements being driven by the power source. To this end, the beacon power management system includes a combination of hardware and software that continuously adjusts the voltage supplied to one or more emitters in the beacon, such as infrared or thermal light emitting diodes (LEDs) or other devices that emit infrared or thermal signatures, that emit a signaling program to ensure that the current flowing through the emitters will allow the signaling program to be continuously emitted for a predetermined amount of time, such as throughout the duration of a mission, while being powered by a limited energy capacity power source. Adjustments to the driving voltage are be based on comparing an actual current through the emitters with a determined current setting and comparing an actual voltage of the power source with a minimum power source voltage. Adjustments to the driving voltage are made to cause the actual current flowing through the emitters to be approximately equal to a determined current setting and to ensure that the actual voltage of the power source is greater than a minimum power source voltage. Forcing the current to be approximately equal to a determined current setting serves to manage the power consumed by the emitters, and thus may optimize the life of the power source. Ensuring that the power source voltage is greater than a minimum power source voltage ensures that the power source outputs a voltage sufficient to power the beacon, and may also optimize the life of the power source. In this manner, systems and methods consistent with the present disclosure allow a beacon to be powered by a limited energy capacity power source while continuously emitting a signaling program for a predetermined amount of time, such as throughout the duration of a mission.

More specifically, systems and methods consistent with the present disclosure, for each signaling program to be emitted by a beacon, determine a program density of the signaling program. An initial driving voltage to be supplied to one or more emitters during a start-up procedure is determined using the program density. A current setting for the current flowing through the emitters that enables the emitters to repeatedly execute the signaling program for a predetermined amount of time while being powered by a power source is determined using the initial driving voltage. The initial driving voltage is supplied to the emitters during a start-up procedure and may be adjusted to a start-up voltage based on a comparison between the current through the emitters during the start-up procedure (i.e., a start-up current) and the current setting and a comparison between a voltage of the power source during the start-up procedure (i.e., a start-up power source voltage) and a voltage below which the power source will not function (a minimum power source voltage). The signaling program is initially executed using the start-up voltage. The start-up voltage may subsequently be adjusted to a signaling voltage based on a comparison between the current through the emitters during the execution of the signaling program (i.e., an execution current) and the current setting and a comparison between a voltage of the power source during the first execution of the signaling program (i.e., an execution power source voltage) and the minimum power source voltage.

The systems and methods consistent with the present disclosure are based on several observations about operational principles of beacons in which such systems and methods may be used. One such observation is that, due to the nonlinear current-voltage characteristics of emitters, such as infrared and thermal LEDs and other devices that emit infrared or thermal signatures, the current flowing through the emitters, rather than the voltage supplied to the emitters, may be monitored and managed to optimize the life of a limited energy capacity power source. As is well known, the nonlinear current-voltage characteristics of emitters such as LEDs can result in large changes in the current flowing through the emitters when there are only small corresponding changes in the voltage supplied to the emitters. Such large changes in current can in turn result in correspondingly large increases in the power consumed by the emitters and a depletion of the power source if left unchecked. Thus, systems and methods consistent with the present disclosure adjust the driving voltage supplied to emitters to cause the current flowing through the emitters to be approximately equal to a determined current setting.

Another observation is that when using a limited energy capacity power source, such as an AA battery, there is a point after which the power source will break down and no longer be able to power a given load. This point is known as the collapsed state of the power source. By connecting a power source to a given load, such as a beacon that emits a signaling program for a predetermined amount of time, and observing the performance of the power source over time, a voltage of the power source corresponding to a point in time when the power source enters into the collapsed state may be empirically determined. Systems and methods consistent with the present disclosure use this empirically determined power source voltage and adjust the driving voltage supplied to emitters so that the voltage of the power source is greater than this empirically determined power source voltage (i.e., a minimum power source voltage). Ensuring that the power source voltage is greater than this minimum power source voltage ensures that the power source outputs a voltage sufficient to power the beacon, and may also optimize the life of the power source.

Yet another observation is that signaling programs generally have a fixed duration (for example a duration of 8 seconds), during which time one or more emitters flashes on and off in a specific sequence or pattern. Accordingly, emitters that execute the signaling pattern may not be constantly on, and, therefore, may not be constantly consuming power. It is thus possible to determine a program density of a signaling program, which represents the percentage of time during a signaling program's duration that the emitters are on and consuming power, and to use the determined program density to determine a current setting that will allow the beacon to repeatedly emit the signaling program for a predetermined amount of time, such as throughout the duration of a mission. It may also be possible to optimize the program density of a signaling program by reducing the flash length and the number of flashes in a signaling program executed by the emitters. Systems and methods consistent with the present disclosure therefore determine the program density of a signaling program to achieve beacon power management. In some embodiments, the signaling programs may have optimized program densities.

The program density of a signaling program may be determined by, for example, sampling the signaling program. The signaling program can be sampled by dividing the signaling program into smaller parts. For example, a signaling program having a duration of 8 seconds can be sampled by dividing it into 400 parts, yielding 50 samples per second, or a sampling rate of 50 Hz. A signaling program sampled in this manner is a digital representation of the signaling code, and has a number of bits, or bit length, equal to the number of samples. Each bit of the sampled signaling program may be assigned a digital value of a "1" or a "0", where a value of "1" corresponds to the emitters being on and a value of "0" corresponds to the emitters being off. Alternatively, a value of "0" could correspond to the emitters being on and a value of "1" could correspond to the emitters being off. Regardless of the logical representation used, the program density is calculated by determining the total number of samples having a value corresponding to an on state of the emitters and dividing that number by the total number of samples. For example, if the total number of samples corresponding to an on state of the emitters is 200 and there are 400 total samples, the program density would be 50%. Signaling programs used by beacons consistent with the present disclosure may have program densities between 1.6-50%. While in the example described above the signaling program has a duration of 8 seconds and a sampling rate of 50 Hz, the signaling program duration and the sampling rate can have any value in systems and methods consistent with the present disclosure.

Another observation is that the characteristics of the power source, the steady state power consumed by the electronics in the beacon exclusive of the power consumed by the emitters, and the predetermined amount of time during which a beacon may need to emit a signaling code (i.e., the duration of a mission) may be known. Accordingly, these parameters, along with the program density, may be used to determine an initial voltage at which the emitters are driven upon beacon power up. The current setting that will allow the beacon to continuously emit the singling program for a predetermined amount of time, such as throughout the duration of a mission, while being powered by a limited capacity power source may, in turn, be determined using the initial voltage.

For example, a single AA battery may be used as the power source in a beacon consistent with the present disclosure. The average energy rating of this power source is known, and may have a value of, for example, 2 Watt-hours. Similarly, it may be known that the duration of a mission will be 10 hours, and that the beacon should emit the signaling code for this predetermined amount of time. By dividing the energy rating of the power source by the duration of the mission, the power that can be supplied by the power source can be determined. In the example above, the power that can be supplied by the AA battery having an energy rating of 2 Watt-hours for a 10 hour mission is 2 Watt-hours/10 hours, or 0.2 Watts. Once the available power supply of the power source is determined, the known steady-state demand for power of the electronics of the beacon exclusive of the power demand of the emitters can be subtracted from the available power of the power source to determine the power available to be consumed by the emitters. Continuing with the example, if the known, steady-state demand for power of the beacon electronics exclusive of the power demand of the emitters is 0.05 Watts, then the available power that the emitters can consume is 0.150 Watts. The amount of signaling power needed by the emitters to ensure that the emitters will emit a signaling program having a given program density can be computed by dividing the power available to the emitters by the program density of the signaling program. Thus, in the example above, the signaling power needed by the emitters to ensure that the emitters will emit a signaling program having a 50% program density for 10 hours can be obtained by dividing the 0.150 Watts available to the emitters by the program density of 0.50, and is 0.3 Watts. An initial voltage at which the emitters are driven upon beacon power up (i.e., an initial driving voltage), can be determined from the computed signaling power. In some embodiments, a look up table may be used to determine an initial driving voltage needed to result in the computed signaling power. A current setting that will allow the beacon to continuously emit the signaling program throughout the duration of a mission while being powered by a limited capacity power source may, in turn, be determined using the initial voltage. In some embodiments, the current setting may be determined using the computed signaling power, the initial driving voltage, and the standard power equation, P=IV. For example, given a signaling power of 0.3 Watts and an initial driving voltage of 3 Volts, the current setting would be 0.3 Watts divided by 3 Volts, or 100 milliamps. While this example used an AA battery as the power source, any power source, such as a rechargeable battery powered by a solar source, or a battery box having a 9 Volt output, may be used in systems and methods consistent with the present disclosure.

The foregoing discussion is intended to introduce and provide initial clarity for some of the aspects associated with the present disclosure. Further details of the above-mentioned functionality and additional aspects, features, and embodiments of the present disclosure are described below. In particular, reference will now be made in detail to the exemplary embodiments implemented according to the present disclosure, the examples of which are illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the disclosure.

FIG. 1 is a block diagram of an exemplary beacon 100 in which power management systems and methods consistent with embodiments of the present disclosure operate. One skilled in the art will appreciate that beacon 100 may be implemented in a number of different configurations without departing from the scope of the present disclosure. In the embodiment shown in FIG. 1, beacon 100 includes a power source module 110, an operator interface module 120, a communication module 130, a microcontroller 140, a clock module 150, a voltage driver module 160, one or more infrared LEDs 170, and a current monitor module 180. While FIG. 1 includes infrared LEDs 170, beacon 100 may alternatively include other types of emitters, including thermal LEDs or other devices that emit thermal or infrared signatures.

Power source module 110 includes a power source 112, a step-up converter 114, and an on/off switch 116. Power source 112 supplies an output voltage used to power the other components of beacon 100. In some embodiments, power source 112 may be a single AA battery having an output voltage of 1.1-1.5 Volts. While power source 112 has been described as an AA battery, power source 112 may be any power source having an output voltage and therefore an output power that may not satisfy the voltage and power requirements of other components of beacon 100. For example, power source 112 may alternatively be a rechargeable battery powered by a solar source or may be a battery box having an output voltage of 9 Volts. Due to the inability of power source 112 to meet the voltage requirements of some of the other components of beacon 100, power source module 110 includes step-up converter 114. Step-up converter 114 may be any device that steps up the voltage supplied by power source 112 to a voltage level sufficient to power some of the other components of beacon 100, such as microcontroller 140 and clock module 150, and that supplies the stepped-up voltage to microcontroller 140 and clock module 150. Step-up converter 114 may, for example, be a device that steps up the 1.5 Volt output of an AA battery to the 5 Volts that may be needed to power a microcontroller, such as microcontroller 140 and that supplies that 5 Volts to microcontroller 140. On/off switch 116 may be any device that allows a user to turn beacon 100 on and off, such as a pushbutton switch. Once switched to the on position, on/off switch 116 completes an electronic circuit including power source 112, which allows components of beacon 100 to be powered by power source 112 through step-up converter 114. Power management systems and methods consistent with the present disclosure may be invoked each time program on/off switch 116 is switched to the on position. In addition, once on/off switch 116 is switched to the on position, a user may interact with operator interface system 120.

Operator interface system 120 includes program control switch 122, one or more program indicator LEDs 124-a to 124-c, and a synchronization control switch 126, and allows a user to interact with beacon 100 to perform various functions. Program control switch 122 and synchronization control switch 126 may be any type of switch, such as a pushbutton switch that is electrically connected to microcontroller 140 such that microcontroller 140 senses when program control switch 122 or synchronization control switch 126 are operated. Program control switch 122 is used to select one or more factory-installed signaling programs from beacon 100 and to record new signaling programs. The total number of signaling programs that may be present in beacon 100, whether factory-installed or user-recorded, is limited by the capacity of a memory included in microcontroller 140, as further described below. A new signaling program may be recorded by, for example, repeatedly operating program control switch 122 during a desired time interval to create a pattern according to which infrared LEDs 170 may flash. Power management systems and methods consistent with the present disclosure may be invoked each time program control switch 122 is operated to select a signaling program from the factory-installed signaling programs or is operated to enter a new signaling program. Whenever program control switch 122 is operated in this manner, beacon 100 may reboot, i.e., may power off and then power back on, before invoking power management systems and methods. Program indicator LEDs 124-a-124-c may be any type of LEDs, and may demonstrate a factory-installed signaling code to a user, may indicate whether a factory installed code or a user installed code has been selected, or may indicate when beacon 100 cannot hold additional signaling programs. Synchronization control switch 126 is used when beacon 100 is acting as a synchro beacon as described in, for example, U.S. Pat. No. 7,456,754, the entirety of which is incorporated herein by reference. When beacon 100 is acting as a synchro beacon, it may be a master beacon or a slave beacon. If beacon 100 is a master beacon, it transmits a signaling program to other beacons that beacon 100 and the other beacons will use as their signaling programs. If beacon 100 is a slave beacon, it receives a signaling program from another beacon that it and the other beacon will use as their signaling program. In either case, synchronization control switch 126 is operated to indicate that beacon 100 is acting as either a master or slave beacon and communication between beacon 100 and the other beacons occurs through communication module 130.

Communication module 130 includes an infrared link detector 132 and an infrared link emitter 134, and is used when beacon 100 is acting as a synchro beacon. Infrared link detector 132 may be any type of infrared receiver, and is used to receive a signaling program and clock synchronization information from another beacon when beacon 100 is being used as a synchro beacon. Infrared link emitter 134 may be any type of infrared transmitter, and is used to transmit a signaling program and clock synchronization information to another beacon when beacon 100 is being used as a synchro beacon. Exemplary embodiments of infrared link detector 132 and infrared link emitter 134 are described in, for example, U.S. Pat. No. 7,456,745. Power management systems and methods consistent with the present disclosure may be invoked each time infrared link detector 132 receives a signaling program and clock synchronization information from another beacon. Whenever infrared link detector 132 is used in this manner, beacon 100 may reboot, i.e., may power off and then power back on, before invoking power management systems and methods. When infrared link detector 132 receives a signaling program and clock synchronization information from another beacon, it sends this information to microcontroller 140.

Microcontroller 140 may be any device that ties together and drives the other elements of exemplary beacon 100, and includes a processor 142, a memory 144, peripheral devices 146a-146n, and an interface device 148. Processor 142 may be one or more processing devices, such as a central processing unit (CPU), which executes program instructions to perform various functions, such as the power management processes described in more detail below with respect to FIGS. 3-5. Memory 144 may be one or more storage devices that maintain data (e.g., instructions, software applications, information used by and/or generated during execution of instructions or software applications, etc.) used by processor 142. For example, memory 144 may store one or more factory-installed signaling programs or user-entered signaling programs. Further, memory 144 may store one or more programs that, when executed by processor 142, perform one or more power management processes consistent with the present disclosure. Memory 144 may also store information used by and/or generated during execution, by processor 142, of programs that perform one or more power management processes consistent with the present disclosure. Examples of such power management processes and the information used and/or generated by such power management processes are described in greater detail below, with respect to FIGS. 3-5. Memory 144 may be any kind of storage device that maintains data. For example, memory 144 may include one or more of ROM, RAM, flash memory, or the like. Peripheral devices 146a-146n may be any devices that expand the functionality of microcontroller 140, such as one or more analog-to-digital (A/D) converters, latches, (digital-to-analog) D/A converters, digital signal modulators, or the like. In some embodiments, peripheral devices 146a-146n include a first A/D converter that converts an analog voltage corresponding to a measured current through infrared LEDs 170 supplied by current monitor module 180 to a digital value, and a second A/D converter that converts the analog voltage of power source 112 to a digital value. These digital values are stored in memory 144 and are used by processor 142 when executing one or more power management processes consistent with the present disclosure as described in greater detail below, with respect to FIGS. 3-5. Interface device 148 may be one or more known interface device modules that facilitate the exchange of data between internal components of microcontroller 140 and external components within beacon 100.

Clock module 150 may include a crystal oscillator (not shown) and one or more frequency dividers (not shown). Clock module 150 is used to supply a clock signal to microcontroller 140. In addition, clock module 150 supplies a clock signal used for the timing of a signaling program emitted by beacon 100, whether operating as a master synchro beacon or whether operating as a non-synchro beacon. This clock signal used for the timing of a signaling program may also be synchronized to the same setting as the clock of another beacon when beacon 100 operates as a slave synchro beacon.

Voltage driver module 160 may be any device or combination of devices that can supply a variable voltage drive infrared LEDs 170. Voltage driver module 160 includes, for example, a potentiometer 162 and a step-up converter 164. Potentiometer 162 may be any digital device that mimics the analog functions of a voltage divider having variable resistivity and that provides an adjustable output voltage from a fixed input voltage. Potentiometer 162 receives an input voltage from step-up converter 114 and generates an output voltage having a value within a given range of voltages. For example, potentiometer 162 may output a voltage of zero volts to its fixed input voltage. The range of output voltages of potentiometer 162 may be divided into a series of steps based on the values of an element having variable resistivity in potentiometer 162 (not shown), with each step being separated from the previous step and the next step by a fixed increment. Thus, potentiometer 162 increases or decreases the value of its output voltage within its output voltage range by the fixed increment. The value of the fixed increment may be any value, and may have, for example, a value of 20 millivolts. Potentiometer 162 receives a command from microcontroller 140 to set the value of its output voltage and to increase or decrease (i.e., adjust) the value of its output voltage by the fixed increment. In this manner, potentiometer 162 steps through its range of permissible output voltages. Potentiometer 162 provides its output voltage to step-up converter 164. Step-up converter 164 may be any device that converts the voltage supplied to it by potentiometer 162 to a voltage level sufficient to drive infrared LEDs 170. Step-up converter 170 receives the sampled signaling program from microcontroller 140 and uses the sampled signaling program in conjunction with the output voltage received from potentiometer 162 to supply the stepped-up voltage to infrared LEDs 170, causing infrared LEDs 170 to flash on and off in a manner consistent with the sampled signaling program.

Infrared emitter LEDs 170 may be one or more infrared LEDs that execute a signaling program. Infrared LEDs 170 execute a signaling program by flashing on and off according to a predetermined sequence or pattern that makes up the signaling program. Infrared LEDs 170 are driven by a voltage supplied from step-up converter 164, and may draw a current that may be monitored by current monitor module 180. In one embodiment, the frequency at which infrared LEDs 170 are supplied with a voltage from step-up converter 164 may vary. For example, infrared LEDs may be supplied with a voltage from step-up converter 164 at a frequency of 100 Hertz rather than being constantly supplied with a voltage from step-up converter. Infrared LEDs 170 may be supplied with a voltage from step-up converter 164 at any frequency so long as the frequency is greater than the time it takes for the current voltage characteristic of infrared LEDs 170 to decay into an off state. The frequency at which infrared LEDs 170 are supplied with a voltage from step-up converter may be controlled by microcontroller 140.

Current monitor module 180 may be any device or combination of devices that monitors the current through infrared LEDs 170. For example, current feedback module may include a current sense resistor 172 and a current monitor 174, that are used together to monitor the current through infrared LEDs 170. Because the current through infrared LEDs 170 cannot be measured directly, current feedback module 180 converts the current through infrared LEDs to a corresponding voltage using well-known techniques. This corresponding voltage is sent to peripheral device 146*a* comprising an A/D converter and is stored by memory 144 and used by processor 142 during execution of one or more power management processes described in more detail below with respect to FIGS. 3-5.

Figure 2:
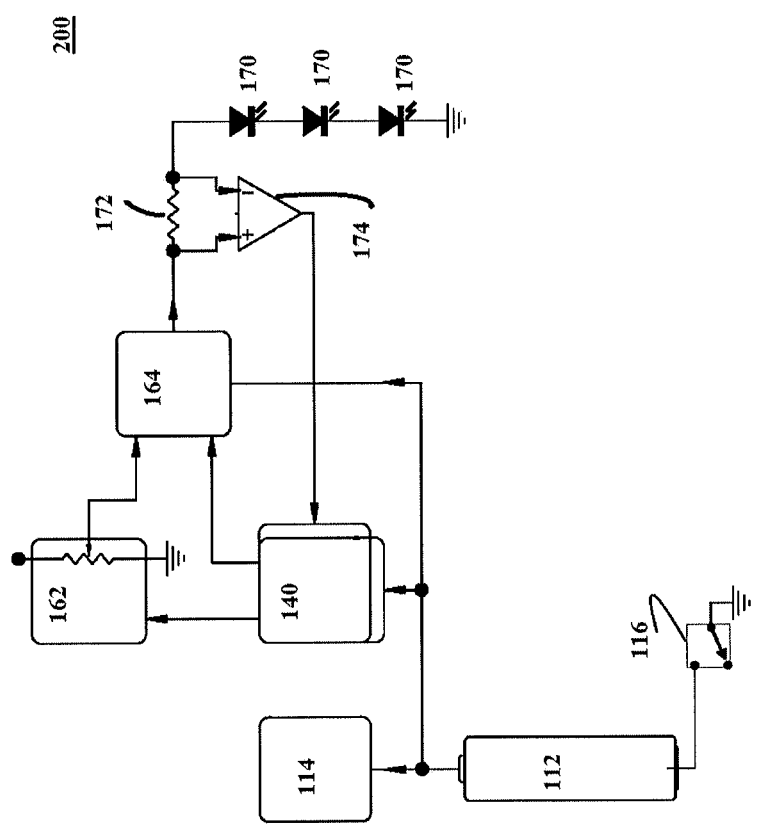
FIG. 2 is a circuit diagram of an exemplary power management system consistent with embodiments of the present disclosure.

Referring now to FIG. 2, there is provided a circuit diagram representation of an exemplary power management system 200 for implementation in beacon 100 and consistent with embodiments of the present disclosure. One skilled in the art will appreciate that system 200 may be implemented in a number of different configurations without departing from the scope of the present disclosure. In the embodiment shown in FIG. 2, power management system 200 includes on/off switch 116, power source 112, step-up converter 114, microcontroller 140, potentiomenter 162, step-up converter 164, infrared LEDs 170, current sense resistor 172, and current monitor 174. The components of the exemplary power management system of FIG. 2 operate in the same manner as described above with respect to FIG. 1. Accordingly, a detailed discussion of on/off switch 116, power source 112, step-up converter 114, microcontroller 140, potentiomenter 162, step-up converter 164, infrared LEDs 170, current sense resistor 172, and current monitor 174 will not be repeated here.

The arrangements shown in FIGS. 1 and 2 are exemplary, and beacon 100 and power management system 200 may be implemented in a number of configurations without departing from the spirit and scope of the present disclosure. For example, while the embodiments shown in FIGS. 1 and 2 include infrared LEDs 170, beacon 100 and power management system 200 may alternatively include other emitters, such as thermal LEDs or other devices that emit thermal or infrared signatures. Further, while power source 112 has been described as an AA battery, any power source having a voltage output lower than the operating voltage of the LEDs being driven by the power source may be included in beacon 100 and power management system 200. For example, power source 112 may be a rechargeable battery powered by a solar source or may be a battery box having an output voltage that is used to drive thermal LEDs or other devices that emit thermal signatures.

Figure 3:
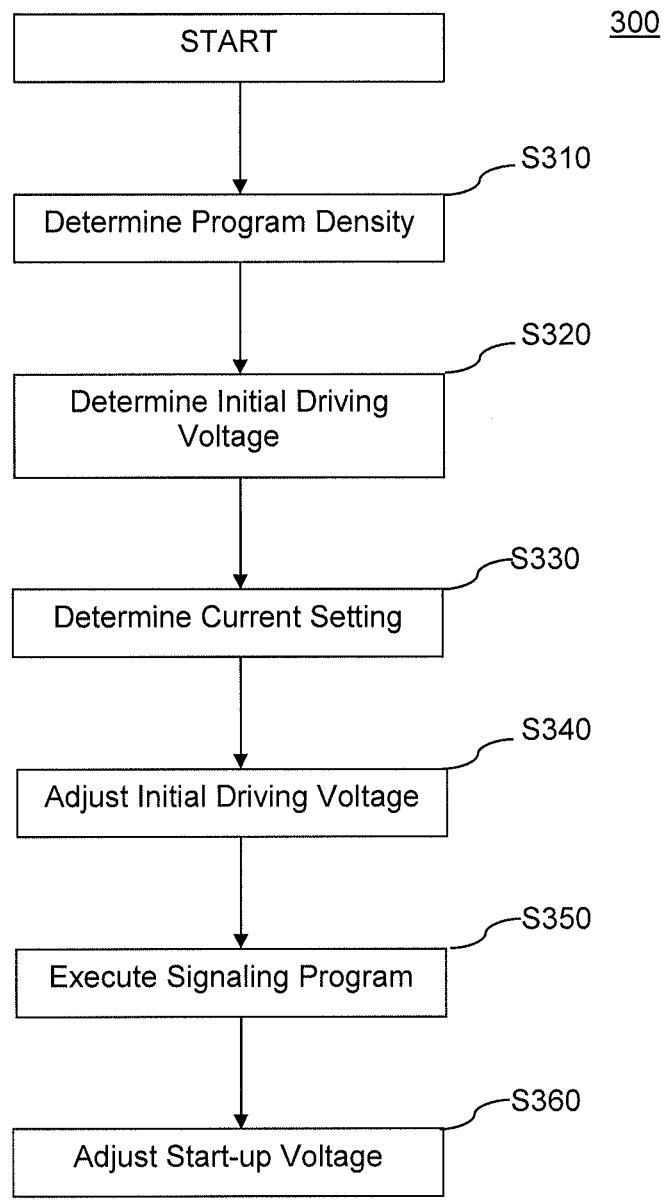
FIG. 3 is a flowchart demonstrating an exemplary power management process, consistent with the embodiments of the present disclosure.

FIG. 3 is a flowchart of an exemplary power management process 300, consistent with the embodiments of the present disclosure. Process 300 begins when beacon 100 is first powered on, or whenever there is a signaling program change. As described above, in some embodiments, when there is a signaling program change, beacon 100 may reboot. Accordingly, process 300 may occur every time beacon 100 is powered on.

As shown in FIG. 3, process 300 begins by determining a program density of a signaling program (S310). The program density is determined by sampling the signaling program using a predetermined sampling rate, determining the number of samples having a value corresponding to an on-state of infrared LEDs 170, and dividing the number of samples having a value corresponding to an on-state of infrared LEDs 170 by the total number of samples, as described above. In one embodiment, processor 142 executes instructions and retrieves data stored in memory 144 to determine the program density of the signaling program. For example, memory 144 may store data including what signaling program is currently being used, the sampling rate, and the sampled signaling code, and may store instructions for determining the signaling program density. Processor 142 retrieves these data and instructions from memory 144 and executes the instructions with these data as inputs to determine the program density.

Subsequently, an initial driving voltage is determined (S320). The initial driving voltage is determined using the power needed by infrared LEDs 170 to execute the signaling program throughout a predetermined period of time, such as the duration of a mission. The power needed by infrared LEDs 170, is, in turn, determined using the average energy rating of power source 112, the predetermined amount of time, and the steady-state demand for power of the beacon electronics exclusive of the power demand of infrared LEDs 170, as described above. In one embodiment, processor 142 executes instructions and retrieves data stored in memory 144 to determine the initial parameters associated with a given signaling program. For example, memory 144 may store data including the average energy rating of power source 112, the predetermined amount of time, the steady-state demand for power of the beacon electronics exclusive of the power demand of infrared LEDs 170, and instructions for determining the initial driving voltage using these data. Memory 144 may also include a look-up table from which the initial driving voltage can be determined once the power needed for infrared LEDs 170 is determined. Processor 142 retrieves these data and instructions from memory 144 and executes the instructions with these data as inputs to determine the initial driving voltage.

The current setting is next determined from the initial driving voltage (S330). The current setting is determined using the standard power equation, P=IV, as described above. The current setting enables infrared LEDs 170 to repeatedly execute the signaling program for the predetermined amount of time, such as the duration of the mission. In one embodiment, processor 142 executes instructions and retrieves data stored in memory 144 to determine the current setting. For example, memory 144 may store data including the power needed by LEDs 170 to execute the signaling program for the predetermined amount of time and the initial driving voltage and instructions for determining the current setting. Processor 142 retrieves these data and instructions from memory 144 and executes the instructions with these data as inputs to determine the current setting. In one embodiment, the current setting is stored in memory 144 after it has been determined.

Subsequently, the initial driving voltage is adjusted to a start-up voltage based on a comparison between the current through infrared LEDs 170 during a start-up procedure (i.e., a start-up current) and the current setting determined in S330 and a comparison between the voltage of power source 112 during the start-up procedure (i.e., a start-up power source voltage) and a minimum power source voltage (S340). Step S340 adjusts the initial driving voltage to a start-up voltage that causes a current through infrared LEDs 170 to be approximately equal to the current setting and results in a voltage of the power source being greater than the minimum power source voltage. As described above, the minimum power source voltage is the empirically determined voltage of the power source corresponding to a point in time when the power source enters into a collapsed state. In one embodiment, microcontroller 140 adjusts the initial driving voltage. For example, processor 142 executes instructions stored in memory 144 that cause microcontroller 140 to send one or more commands to potentiometer 162 instructing potentiometer 162 to increase or decrease its output voltage so that the voltage supplied to infrared LEDs 170 from step-up converter 164 is equal to the start-up voltage based on a comparison between the start-up current and the current setting and a comparison between the start-up power source voltage and the minimum power source voltage. Each command sent by microcontroller 140 may be a command to increase or decrease the output voltage of potentiometer 162 by a single step, i.e., by the fixed increment described above. The processes used to adjust the initial driving voltage to the start-up voltage are described in greater detail below with respect to FIG. 4.

Next, the signaling program is executed (S350). The start-up voltage is supplied to infrared LEDs 170 to drive infrared LEDs 170 during execution of the signaling program, and the execution of the signaling program therefore uses the start-up voltage. In one embodiment, infrared LEDs 170 execute the signaling program. For example, processor 142 executes instructions stored in memory 144 that cause microcontroller 140 to send the sampled signaling program to step-up converter 164, which, in turn, may supplies the start-up voltage to infrared LEDs 170 to cause infrared LEDs 170 to flash on and off in a manner consistent with the sampled signaling program. In one embodiment, the current through infrared LEDs 170 during execution of the signaling program (i.e., the execution current) is measured. The execution current is measured the last time infrared LEDs flash during a signaling program, i.e., when the last bit of the digital signaling program that causes infrared LEDs 170 to turn on executes. In one embodiment, the execution current is measured by a combination of hardware and software. For example, current monitor module 180 may measures a voltage corresponding to the execution current in the manner described above with respect to FIG. 1. This corresponding voltage is sent to peripheral device 146*a* comprising an A/D converter. A/D converter 146*a* converts the voltage into a digital voltage that is stored in memory 144. Processor 142 retrieves the stored voltage from memory, converts the voltage into current using instructions for doing so that are stored in memory 144, and stores the execution current in memory 144. The voltage of power source 112 during execution of the signaling program (i.e., execution power source voltage) is also measured. The execution power source voltage is measured the last time infrared LEDs flash during a signaling program, i.e., when the last bit of the digital signaling program that causes infrared LEDs 170 to turn on executes. In one embodiment, the execution power source voltage is measured by peripheral device 146*b* comprising a second A/D converter. A/D converter 146*b* converts the execution power source voltage into a digital voltage that is stored in memory 144.

Subsequently, the start-up voltage is adjusted to a signaling voltage based on a comparison between the current through infrared LEDs 170 during execution of the signaling program (i.e., an execution current) and the current setting determined in S330 and a comparison between the voltage of power source 112 during execution of the signaling program (i.e., an execution power source voltage) and a minimum power source voltage (S360). Step S360 adjusts the start-up voltage to a signaling voltage that causes a current through infrared LEDs to be approximately equal to the current setting and results in a voltage of the power source being greater than the minimum power source voltage. As described above, the minimum power source voltage may be the empirically determined voltage of the power source corresponding to a point in time when the power source enters into a collapsed state. In one embodiment, microcontroller 140 adjusts the start-up voltage. For example, processor 142 executes instructions stored in memory 144 that cause microcontroller 140 to send one or more commands to potentiometer 162 instructing potentiometer 162 to increase or decrease its output voltage so that the voltage supplied to infrared LEDs 170 from step-up converter 164 is equal to the signaling voltage based on a comparison between the execution current and the current setting and a comparison between the execution power source voltage and the minimum power source voltage. Each command sent by microcontroller 140 is a command to increase or decrease the output voltage of potentiometer 162 by a single step, i.e., by the fixed increment described above. The processes used to adjust the start-up voltage to the signaling voltage are described in greater detail below with respect to FIG. 5.

Figure 4:
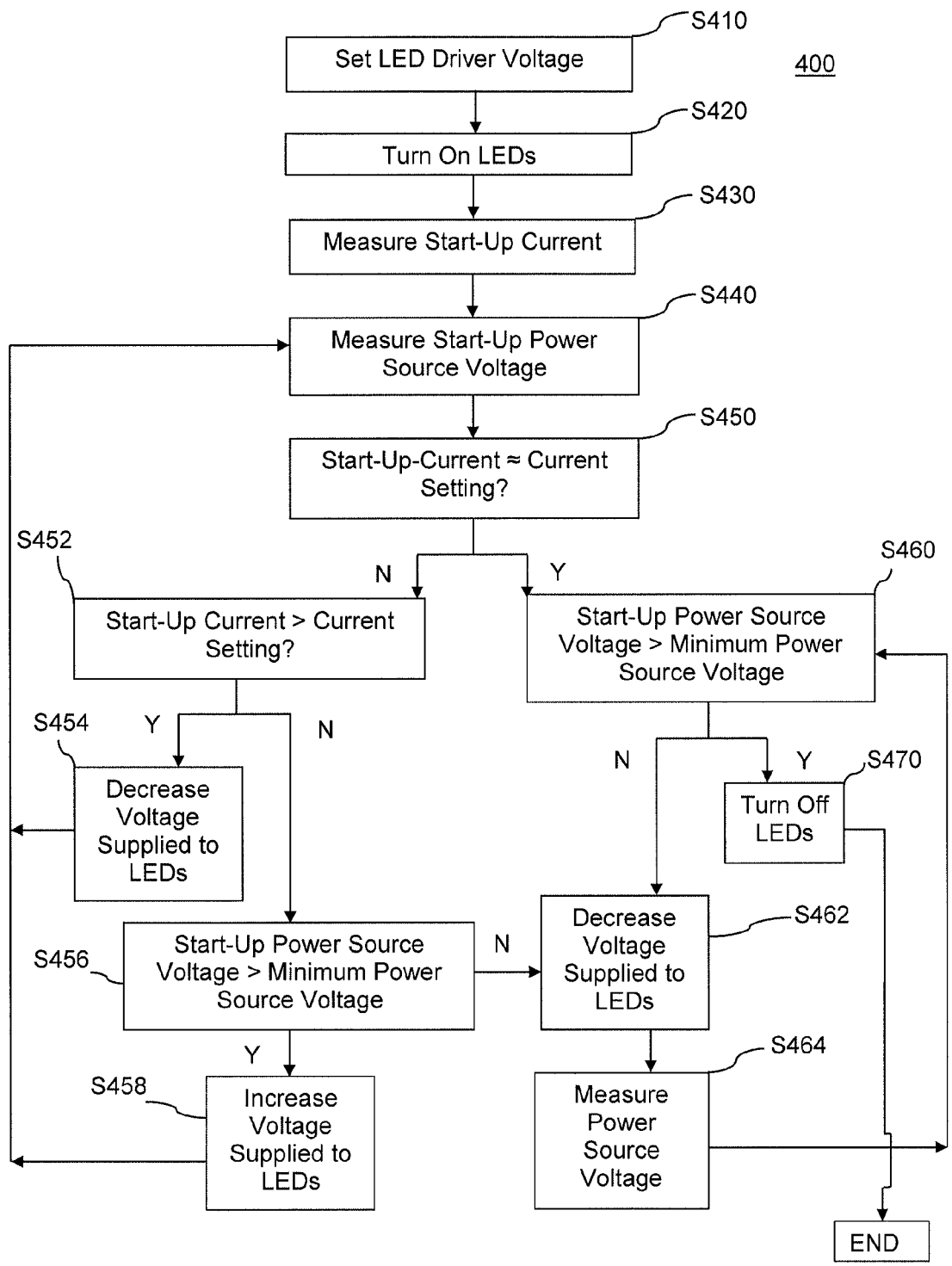
FIG. 4 is a flowchart demonstrating an exemplary process for adjusting an initial driving voltage, consistent with the embodiments of the present disclosure.

FIG. 4 is a flowchart of an exemplary process 400 for adjusting the initial driving voltage to a start-up voltage, consistent with the embodiments of the present disclosure. Process 400 shown in FIG. 4 may be performed after a program density, initial driving voltage, and current setting are determined for a given signaling program, and may be performed once each time the signaling program changes. Because process 400 adjusts the initial driving voltage to a start-up voltage, and because the start-up voltage drives infrared LEDs the first time the signaling program executes, FIG. 4 is referred to herein as a start-up procedure.

As shown in FIG. 4, process 400 begins by setting the voltage at which infrared LEDs 170 will be driven to the initial driving voltage (S410). In one embodiment, processor 142 sets the infrared LED driving voltage to the initial driving voltage. For example, processor 142 executes instructions stored in memory 144 that cause microcontroller 140 to send one or more commands to potentiometer 162 instructing potentiometer 162 to output a voltage that step-up converter 164 converts to the initial driving voltage that converter 164 will supply to infrared LEDs 170. Subsequently, infrared LEDs 170 are turned on by, for example, being driven by the initial driving voltage (S420). In one embodiment, step-up converter 164 turns on infrared LEDs 170 after receiving an output voltage from potentiometer 162 that cause step-up converter to supply the initial driving voltage to infrared LEDs 170.

After infrared LEDs 170 are turned on, a current through infrared LEDs 170 is measured (S430). This current is referred to as the start-up current. In one embodiment, the start-up current is measured by a combination of hardware and software. For example, current monitor module 180 measures a voltage corresponding to the start-up current in the manner described above with respect to FIG. 1. This corresponding voltage is sent to peripheral device 146*a* comprising an A/D converter. A/D converter 146*a* converts the voltage into a digital voltage that is stored in memory 144. Processor 142 retrieves the stored voltage from memory, converts the voltage into current using instructions for doing so that are stored in memory 144, and stores the start-up current in memory 144.

A voltage of power source 112 is measured next (S440). This voltage may is referred to as the start-up power source voltage. In one embodiment, the start-up power source voltage is measured by peripheral device 146*b* comprising a second A/D converter. A/D converter 146*b* converts the start-up power source voltage into a digital voltage that is stored in memory 144.

Subsequently, the start-up current is compared to the current setting determined in step S330 of FIG. 3 to determine if the start-up current is equal to or within a predetermined tolerance level of the current setting (S450). Because it is unlikely that the start-up current and the current setting will have exactly the same value, a predetermined tolerance level is used to ensure that the process of FIG. 4 does not become an infinite loop, and may be set to, for example, a value that is within 5 milliamperes of the current setting. In one embodiment, processor 142 executes instructions stored in memory 144 to retrieve the start-up current and the current setting from memory 144 and compare the two values. When the start-up current and the current setting are equal to or within the predetermined tolerance level of each other, no adjustment to the initial driving voltage needs to be made to force the current through infrared LEDs 170 to be at a level that will enable infrared LEDs 170 to repeatedly execute the signaling program throughout the predetermined amount of time, such as the duration of the mission, while being powered by power source 112. Accordingly, consistent with the present disclosure, process 400 checks whether the initial driving voltage needs to be adjusted in order to make sure that power source 112 can continue to power beacon 100.

In response to the start-up current being approximately equal to or within the predetermined tolerance level of the current setting, the start-up power source voltage is compared to the minimum power source voltage to determine if the start-up power source voltage is greater than the minimum power source voltage (S460). In one embodiment, processor 142 executes instructions stored in memory 144 to retrieve the start-up voltage and the minimum power source voltage from memory 144 and compare the two values. When the start-up voltage is greater than the minimum power source voltage, the initial driving voltage does not need to be adjusted in order to make sure that power source 112 can continue to power beacon 100. Accordingly, in response to the start-up power source voltage being greater than the minimum power source voltage, infrared LEDs 170 may be turned off (S470) and process 400 ends.

If the start-up power source voltage is not greater than the minimum power source voltage, power source 112 may not be able to continue to power beacon 100 for the predetermined amount of time, and the voltage supplied to infrared LEDs 170 is decreased (S462). Decreasing the voltage supplied to infrared LEDs 170 changes the flow of current through infrared LEDs 170 and thus the voltage of power source 112. In one embodiment, the voltage supplied to LEDs 170 is decreased by the fixed increment that potentiometer 162 uses to step through its range of available output voltages. In one embodiment, the voltage supplied to LEDs 170 is decreased by the fixed increment by microcontroller 140, which issues a command instructing potentiometer 162 to decrease its output voltage by a single step, which, in turn causes step-up converter 164 to supply infrared LEDs 170 with a voltage that has been decreased by the fixed increment of potentiometer 162. Once the voltage supplied to LEDs 170 is decreased, the voltage of power source is measured again (S464). Process 400 then returns to step S460, repeating S462, S464, and S470 as necessary, ensuring that the start-up voltage resulting from these steps causes the current through infrared LEDs 170 to be equal to or within a predetermined tolerance of the current setting and will result in a voltage of the power supply being greater than the minimum power source voltage.

Returning now to step S450, if the start-up current is not equal to or within a predetermined tolerance level of the current setting, an adjustment to the initial driving voltage is made to force the current through infrared LEDs 170 to be at a level that will enable infrared LEDs 170 to repeatedly execute the signaling program throughout the predetermined amount of time, such as the duration of the mission, while being powered by power source 112. Accordingly, when the start-up current is not equal to or within a predetermined tolerance level of the current setting, process 400 next determines if the start-up current is greater than the current setting (S452). In one embodiment, processor 142 executes instructions stored in memory 144 to retrieve the start-up current and the current setting to make this determination. In response to the start-up current being greater than the current setting, the voltage supplied to LEDs 170 is decreased (S454). In one embodiment, the voltage supplied to LEDs 170 is decreased by the fixed increment that potentiometer 162 uses to step through its range of available output voltages. In one embodiment, the voltage supplied to LEDs 170 is decreased by the fixed increment by microcontroller 140, which issues a command instructing potentiometer 162 to decrease its output voltage by a single step, which, in turn causes step-up converter 164 to supply infrared LEDs 170 with a voltage that has been decreased by the fixed increment of potentiometer 162. Once the voltage supplied to LEDs 170 is decreased, process 400 returns to S440, repeating S440 and all of the steps after S440 as necessary, ensuring that the start-up voltage resulting from process 400 causes the current through infrared LEDs 170 to be equal to or within a predetermined tolerance of the current setting and will result in a voltage of the power supply being greater than the minimum power source voltage.

In response to the start-up current not being greater than the current setting, the start-up power source voltage is compared to the minimum power source voltage to determine if the start-up power source voltage is greater than the minimum power source voltage (S456). In one embodiment, processor 142 executes instructions stored in memory 144 to retrieve the start-up power source voltage and the minimum power source voltage from memory 144 and compare the two values. When the start-up power source voltage is not greater than the minimum power source voltage, process 400 goes to S462, and proceeds as described above. When the start-up power source voltage is greater than the minimum power source voltage, the voltage supplied to LEDs 170 is increased (S458). In one embodiment, the voltage supplied to LEDs 170 is increased by the fixed increment that potentiometer 162 uses to step through its range of available output voltages. In one embodiment, the voltage supplied to LEDs 170 is increased by the fixed increment by microcontroller 140, which issues a command instructing potentiometer 162 to increase its output voltage by a single step, which, in turn causes step-up converter 164 to supply infrared LEDs 170 with a voltage that has been increased by the fixed increment of potentiometer 162. Once the voltage supplied to LEDs 170 is increased, process 400 returns to S440, repeating S440 and all of the steps after S440 as necessary, ensuring that the start-up voltage resulting from process 400 causes the current through infrared LEDs 170 to be equal to or within a predetermined tolerance of the current setting and will result in a voltage of the power supply being greater than the minimum power source voltage.

The result of process 400 is a start-up voltage to which the initial driving voltage has been adjusted. By adjusting the initial driving voltage to a start-up voltage based on comparisons between the start-up current and the current setting and comparisons between the start-up power source voltage and the minimum power source voltage as described above, process 400 ensures that the initial driving voltage is adjusted to a start-up voltage that corresponds to a current that enables the signaling program to be repeatedly executed throughout the predetermined amount of time, such as the duration of a mission, while being powered by power source 112. Thus, process 400 serves to optimize the life of power source 112.

Figure 5:
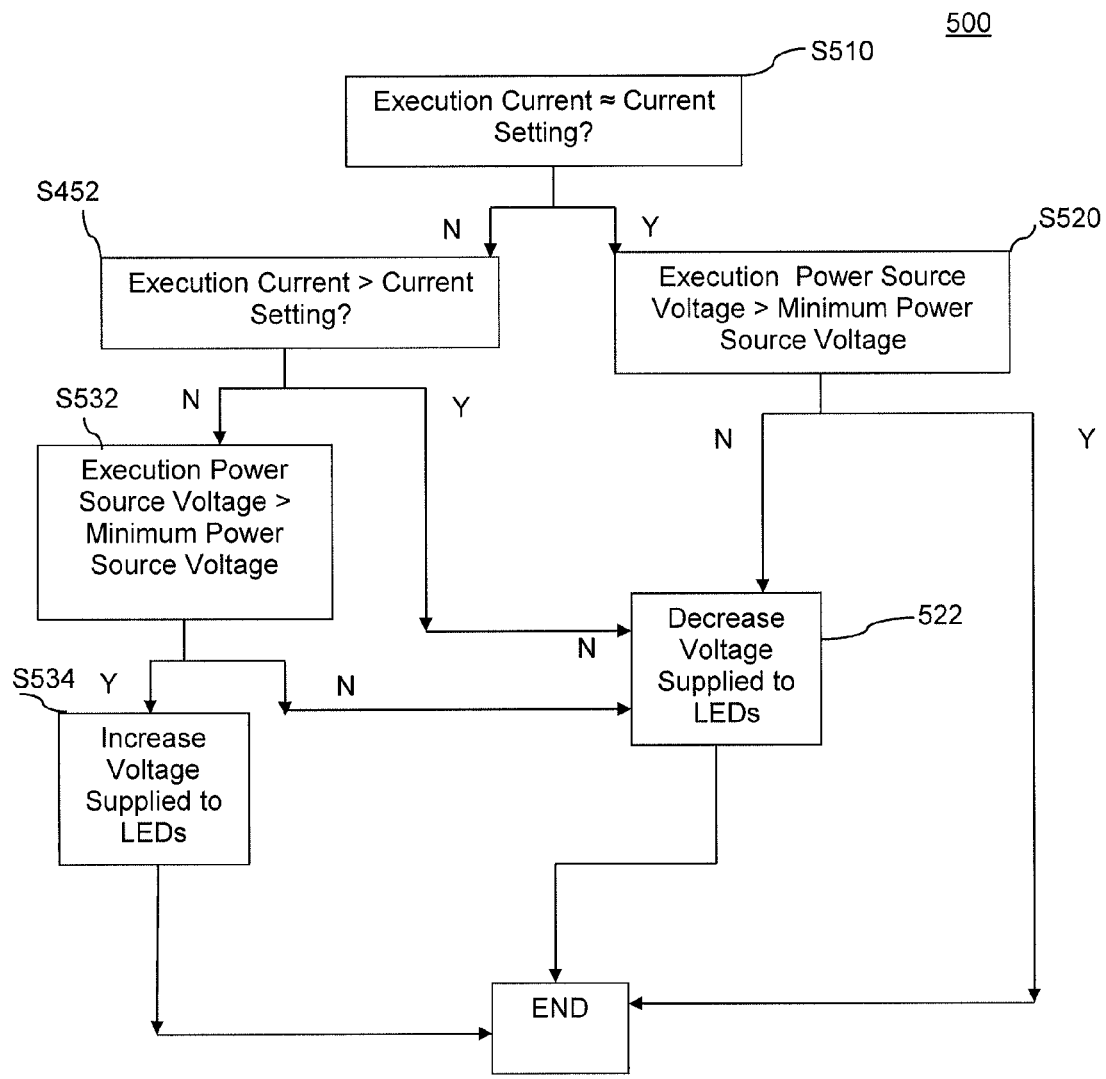
FIG. 5 is a flowchart demonstrating an exemplary process for adjusting a start-up voltage, consistent with the embodiments of the present disclosure.

FIG. 5 is a flowchart of an exemplary process for adjusting the start-up voltage to a signaling voltage, consistent with the embodiments of the present disclosure. Process 500 may be performed after a signaling program executes. As shown in FIG. 5, process 500 begins by comparing a current that was measured during execution of the signaling current (i.e., the execution current) with the current setting determined in step S330 of FIG. 3 (S510). Because it is unlikely that the start-up current and the current setting will have exactly the same value, a predetermined tolerance level is used to ensure that the process of FIG. 5 does not become an infinite loop, and may be set to, for example, a value that is within 5 milliamperes of the current setting. In one embodiment, processor 142 executes instructions stored in memory 144 to retrieve the execution current and the current setting from memory 144 and compare the two values. When the execution current and the current setting are equal to or within the predetermined tolerance level of each other, no adjustment to the start-up voltage needs to be made to force the current through infrared LEDs 170 to be at a level that will enable infrared LEDs 170 to repeatedly execute the signaling program throughout the predetermined amount of time, such as the duration of the mission, while being powered by power source 112. Accordingly, consistent with the present disclosure, process 500 checks whether the start-up voltage needs to be adjusted in order to make sure that power source 112 can continue to power beacon 100.

In response to the start-up current being approximately equal to or within the predetermined tolerance level of the current setting, a voltage of power source 112 that was measured during execution of the signaling program (i.e., the execution power source voltage) is compared to the minimum power source voltage (S520). In one embodiment, processor 142 executes instructions stored in memory 144 to retrieve the execution power source voltage and the minimum power source voltage from memory 144 and compare the two values. When the execution voltage is greater than the minimum power source voltage, the start-up voltage does not need to be adjusted in order to make sure that power source 112 can continue to power beacon 100. Accordingly, in response to the execution power source voltage being greater than the minimum power source voltage process 500 ends.

If the execution power source voltage is not greater than the minimum power source voltage, power source 112 may not be able to continue to power beacon 100 for the predetermined amount of time, and the voltage supplied to infrared LEDs 170 is decreased (S522). Decreasing the voltage supplied to infrared LEDs 170 changes the flow of current through infrared LEDs 170 and thus the voltage of power source 112. In one embodiment, the voltage supplied to LEDs 170 is decreased by the fixed increment that potentiometer 162 uses to step through its range of available output voltages. In one embodiment, the voltage supplied to LEDs 170 is decreased by the fixed increment by microcontroller 140, which issues a command instructing potentiometer 162 to decrease its output voltage by a single step, which, in turn causes step-up converter 164 to supply infrared LEDs 170 with a voltage that has been decreased by the fixed increment of potentiometer 162. Once the voltage supplied to LEDs 170 is decreased, the process of FIG. 5 ends.

Returning now to S510, if the start-up current is not equal to or within a predetermined tolerance level of the current setting, an adjustment to the start-up voltage needs to be made to force the current through infrared LEDs 170 to be at a level that will enable infrared LEDs 170 to repeatedly execute the signaling program throughout the predetermined amount of time, such as the duration of the mission, while being powered by power source 112. Accordingly, when the execution current is not equal to or within a predetermined tolerance level of the current setting, process 500 next determines if the execution current is greater than the current setting (S530). In one embodiment, processor 142 executes instructions stored in memory 144 to retrieve the execution current and the current setting to make this determination. In response to the execution current being greater than the current setting, the voltage supplied to LEDs 170 is decreased (S522), and process 500 proceeds as described above, decreasing the voltage supplied to LEDs 170. After the voltage supplied to infrared LEDs 170 has been decreased, process 500 ends.

In response to the execution current not being greater than the current setting, the execution source voltage is compared with the minimum power source voltage to determine if the execution power source voltage is greater than the minimum power source voltage (S534). In one embodiment, processor 142 executes instructions stored in memory 144 to retrieve the execution power source voltage and the minimum power source voltage from memory 144 and compare the two values. When the execution power source voltage is not greater than the minimum power source voltage, process 500 goes to S522, decreasing the voltage supplied to infrared LEDs 170. When the execution power source voltage is greater than the minimum power source voltage, the voltage supplied to LEDs 170 is increased (S534). In one embodiment, the voltage supplied to LEDs 170 is increased by the fixed increment that potentiometer 162 uses to step through its range of available output voltages. In one embodiment, the voltage supplied to LEDs 170 is increased by the fixed increment by microcontroller 140, which issued a command instructing potentiometer 162 to increase its output voltage by a single step, which, in turn causes step-up converter 164 to supply infrared LEDs 170 with a voltage that has been increased by the fixed increment of potentiometer 162. Once the voltage supplied to LEDs 170 is increased, process 500 ends.

The result of the process of FIG. 5 is a signaling voltage to which the start-up voltage has been adjusted. By adjusting the start-up voltage to a signaling voltage based on comparisons between the start-up current and the current setting and comparisons between the start-up power source voltage and the minimum power source voltage as described above, process 500 ensures that the start-up voltage is adjusted to a signaling voltage that corresponds to a current that enables the signaling program to be repeatedly executed throughout the predetermined amount of time, such as the duration of a mission, while being powered by power source 112. Thus, process 500 serves to optimize the life of power source 112.

In one embodiment, the process of FIG. 5 may be performed every time a signaling program executes when the signaling program repeatedly executes for a predetermined amount of time, such as throughout the duration of a mission. In this embodiment, for repeated executions of the signaling program after the first execution, the driving voltage to be supplied to infrared LEDs during the current execution of the signaling program is set to the voltage resulting from process 500 that took place after the previous execution of the signaling program. In other words, the current execution of the signaling program uses the result of process 500 for the previous execution of the signaling program as the driving voltage supplied to infrared LEDs 170 for the current execution of the signaling program. Process 500 may then be used to adjust this driving voltage to a voltage that will be applied to infrared LEDs 170 during the next execution of the signaling program based on comparisons between the current that was measured during of the current execution of the signaling program and the current setting and the power source voltage that was measured during the current execution of the signaling program and the minimum power source voltage. In this manner, the voltage supplied to infrared LEDs 170 is continuously adjusted throughout the predetermined amount of time.

As described above, systems and methods consistent with the present disclosure provide a beacon power management system that allows a beacon to be powered by a small, readily-available power source having a voltage output that may be lower than the operating voltage of the elements being driven by the power source. For purposes of explanation only, certain aspects and embodiments are described herein with reference to the components illustrated in FIGS. 1-5. The functionality of the illustrated components may overlap, however, and may be present in a fewer or greater number of elements and components. Further, all or part of the functionality of the illustrated elements may co-exist on a single integrated circuit chip or be distributed among several integrated circuit chips. Moreover, embodiments, features, aspects, and principles disclosed herein may be implemented in various environments and are not limited to the illustrated environments. For example, while FIGS. 3-5 have been described with respect to beacons including infrared LEDs 170, the embodiments of FIGS. 3-5 may alternatively apply to beacons including other emitters, such as thermal LEDs or other devices that emit thermal or infrared signatures.

Further, the sequences of events described in FIGS. 1-5 are exemplary and not intended to be limiting. Thus, other process stages may be used, and even with the processes depicted in FIGS. 1-5, the particular order of events may vary without departing from the scope of the disclosed embodiments. Moreover, certain process stages may not be present and additional stages may be implemented in FIGS. 1-5. Also, the processes described herein are not inherently related to any particular system or apparatus and may be implemented by any suitable combination of components.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

The invention claimed is:

1. A method for power management in a beacon, comprising:
   determining a program density of a signaling program;
   determining an initial driving voltage using the program density;
   determining a current setting for an emitter using the initial driving voltage, the current setting enabling the emitter to repeatedly execute the signaling program for a predetermined amount of time while being powered by a power source;
   adjusting the initial driving voltage to a start-up voltage based on a first comparison comparing a start-up current through the emitter with the current setting and a second comparison comparing a start-up power source voltage with a minimum power source voltage;
   executing the signaling program using the start-up voltage; and
   adjusting the start-up voltage to a signaling voltage based on a third comparison comparing an execution current through the emitter with the current setting and a fourth comparison comparing an execution power source voltage with the minimum power source voltage.

2. The method of claim 1, wherein the start-up voltage causes a current through the emitter to be approximately equal to the current setting and results in a voltage of the power source being greater than the minimum power source voltage.

3. The method of claim 1, wherein the signaling voltage causes a current through the emitter to be approximately equal to the current setting and results in a voltage of the power source being greater than the minimum power source voltage.

4. The method of claim 1, further comprising
   measuring the current through the emitter during a start-up procedure, the measured current comprising the start-up current;
   performing the first comparison;
   measuring the voltage of the power source during the start-up procedure, the measured voltage comprising the start-up power source voltage; and
   performing the second comparison.

5. The method of claim 1, further comprising
   measuring the current through the emitter during execution of the signaling program, the measured current comprising the execution current;
   storing the measured current;
   performing the third comparison;
   measuring the voltage of the power source during execution of the signaling program, the measured voltage comprising the execution power source voltage;
   storing the measured voltage; and
   performing the fourth comparison.

6. The method of claim 1, further comprising determining a power level of the emitter based on an energy capacity of the power source, the predetermined amount of time, a steady state power consumption level of the beacon, and the program density.

7. The method of claim 1, wherein the initial driving voltage is determined using the power level of the emitter.

8. The method of claim 1, wherein determining the program density further comprises
   sampling the signaling program using a predetermined sampling rate;
   determining a number of samples having a value corresponding to an on-state of the emitter; and
   dividing the determined number of samples by a total number of samples.

9. The method of claim 1, wherein the emitter repeatedly executes the signaling program after a first execution and until an end of the predetermined amount of time while being powered by the power source.

10. The method of claim 9 further comprising, for each of the repeated executions of the signaling program,
    setting a second driving voltage to be supplied to the emitter during the repeated execution of the signaling program to a voltage equal to an adjusted voltage obtained during a previous execution of the signaling program;
    supplying the second driving voltage to the emitter during the repeated execution of the signaling program; and
    adjusting the second driving voltage to a second signaling voltage based on a fifth comparison comparing a repeated execution current through the emitter with the current setting and a sixth comparison comparing a repeated execution power source voltage with the minimum power source voltage.

11. The method of claim 10, wherein the second signaling voltage causes a current through the emitter to be approximately equal to the current setting and results in a voltage of the power source being greater than the minimum power source voltage.

12. The method of claim 10 further comprising
    measuring the current through the emitter during the repeated execution, the measured current comprising the repeated execution current;

storing the measured current;
performing the fifth comparison;
measuring the voltage of the power source during the repeated execution, the measured voltage comprising the repeated execution power source voltage;
storing the measured voltage; and
performing the sixth comparison.

13. The method of claim 1, wherein the beacon is a synchro beacon.

\* \* \* \* \*